United States Patent

Kawakami et al.

[11] 3,900,538
[45] Aug. 19, 1975

[54] METHOD FOR SURFACE TREATMENT OF PLASTICS

[75] Inventors: Ken-Ichi Kawakami; Kenji Hatada; Yasuhiko Yamaguchi, all of Otsu, Japan

[73] Assignee: Toray Industries, Inc., Tokyo, Japan

[22] Filed: Feb. 13, 1973

[21] Appl. No.: 332,230

[30] Foreign Application Priority Data
Feb. 16, 1972 Japan............... 47-15625

[52] U.S. Cl............. 264/22; 204/168; 264/80
[51] Int. Cl................................ B29c 25/00
[58] Field of Search......... 264/22, 80; 156/82, 272; 117/46 FC, 47 H, 93.1 CD; 204/168

[56] References Cited
UNITED STATES PATENTS

| | | | |
|---|---|---|---|
| 2,632,921 | 3/1953 | Kreidl.................... | 264/80 |
| 2,795,820 | 6/1957 | Grow et al............. | 264/80 |
| 2,859,480 | 11/1958 | Berthold et al....... | 264/22 |
| 2,881,470 | 4/1959 | Berthold et al....... | 264/22 |
| 2,910,723 | 11/1959 | Traver................... | 264/22 |
| 3,415,683 | 12/1968 | Coffman et al........ | 117/93.1 CD |
| 3,590,107 | 6/1971 | Smith, Jr. et al..... | 264/80 |
| 3,619,242 | 11/1971 | Ogawa et al.......... | 117/93.1 CD |
| 3,703,569 | 11/1972 | Wolkowicz............ | 264/22 |

*Primary Examiner*—Robert F. White
*Assistant Examiner*—Gene Auville

[57] ABSTRACT

The present invention relates to a method and apparatus for the production of plastic materials having improved surface bonding properties for bonding other materials to the plastic materials. The new method comprises passing the plastic material through an electrically charged flame. The apparatus used to perform the method may have several embodiments which include an electrical power supply circuit, a discharge electrode, a burner, and a chill-roller for supporting the plastic material.

12 Claims, 4 Drawing Figures

METHOD FOR SURFACE TREATMENT OF PLASTICS

BACKGROUND OF THE INVENTION

This invention relates to a new method and apparatus for the treatment of the surface of a plastic material. Plastics are often used after various applications, for example, coating or lamination with other materials, for example, printing and metallizing. Most of plastic films such as polyethylene film, polypropylene film, polyamide film, and polyethylene-telephythalate film, either oriented or non-oriented, are not really suitable for the above applications because of their poor properties for surface bonding with other materials.

In order to improve the surface characteristics of plastics, various treatments have been tried. Chemical treatments, such as chlorination, oxidation and sulfonation are in general use. Also, flame treatment and electric-discharge treatment are commonly available and commercially used. But these prior art methods are effective only when a strong bond with other materials is not needed. Moreover, each of these prior art methods has various disadvantages, as will now be discussed.

In the case of the prior art flame-treatment, there are several disadvantages. In a gaseous-flame-treatment method in which the film surface is exposed to hot oxidizing flame, so much exposure-time is needed (more than 0.05 sec.) to get a satisfactory adhesive condition, that the treated films become softened, deformed and wrinkled. Moreover, oriented (stretched) films are subject to the problem of heat-shrinkage in the presence of the flame heat. Furthermore, this flame-treatment effect is unstable. It disappears after longtime storage. Moreover, flame-treated film has the disadvantage of having a haze phenomena caused by soot, and the exposing time must be shortened to avoid this haze hindrance. As a consequence, the desired treatment-level may not be achieved.

In the case of the prior art corona-discharge treatment, the simplest application is using high-voltage, high-frequency electrical currents, such as damped waves, sine waves and square waves. The output voltage may, for example, range from 6 KV to 16 KV (max. 60 KV) and the frequency used may range from 10 KC/sec. to 50 KC/sec. (max. 10 MC/sec.). This type treatment has, however, the large disadvantage of being non-uniform, although it has the advantage that the film surfaces may be treated at high speed by increasing the electric power. There also remain some other problems. First, the treatment effect disappears remarkably by any heat-treatment which may follow at the later processes. Secondly, the treatment-effect also drops down by storing in room-atmosphere after the said treatment. Third, the corona-discharge treated films wear excessively, interfering with the desired characteristics.

It has been proposed heretofore that the two treatments, i.e., corona-discharge treatment and flame treatment be independently carried out continuously, one after the other. However, if the process of the flame treatment be used just after the corona treatment, the treatment-effect obtained due to the corona is quickly quenched and disappears because of the heat of the flame. If the above order be reversed, the corona treatment being used just after the flame treatment, then no multiplicative effects of the two treatments are revealed.

The multiplicative effects of the present invention are evident through the fact that the proposed method of using an electrically charged flame remarkably increases the improvement level achieved by the treatment even under conditions where the treatment-level could not be achieved by individual successive treatments by corona and flame-treatment processes.

SUMMARY OF THE INVENTION

This invention relates to improvements of the surface characteristics of plastics, and more particularly relates to methods and apparatus for the production of plastics having improved surface-bonding properties.

One object of this invention is to provide plastics having improved surface characteristics, such as improved bonding properties for other materials. The invention is particularly applicable to preparing the surfaces of plastics for use with printing inks, which do not disappear after longtime storage and/or after heat treatment.

It is another object of the present invention to offer superior plastic electrets.

BRIEF DESCRIPTION OF THE DRAWING

FIG. 1 shows a surface-treatment apparatus in which an electrode serves also as a burner.

FIG. 2 shows a surface-treatment apparatus in which the electrode and burner are separate physically but connected electrically in an electrical circuit.

FIG. 3 shows a surface-treatment apparatus in which the burner is not connected with the electrode either physically or electrically, isolated from the electrical circuit.

DETAILED DESCRIPTION OF THE INVENTION

As indicated hereinabove, the present invention is directed to a method for surface treatment of plastics and to the apparatus for carrying out the method.

The process of the present invention is concerned primarily with treating plastic surfaces with electrically charged flame. The flame used in the present invention is a "self-continuous flame" which is usually obtained, for example, by applying ignition energy to combustible gases mainly consisting of hydrocarbons, or by applying ignition energy to combustible liquids and solids with some oxidizing gases, such as air, oxygen, or otherwise, including such groups as hydrogen, nitrogen, halogen and their mixtures. The term "self-continuous-flame" as used in the present application refers to the gaseous state of substances under some furious reaction self-continuously to develop a combustion flame with luminescence, thermal diffusion, and/or vibrational sound. It may be also referred to as a "state of self-continuous combustional reaction." Diffusion flames and pre-mixed flames are "self-continuous flames." However, "self-continuous flames" do not include flames which are caused by explosions. The combustible gases may include atoms, molecules and active-functional groups which may be changed to ions.

The electric energy used to charge the flames electrically may comprise alternating current (AC), or direct current (DC), or alternating current superposed on direct current (SC).

The most desirable electrical system is constructed by electrically grounding the chill-roller side of the system. This is to say, the film-supporting roll side is connected to ground and the flame burner, or flame electrode, is charged either by AC, DC, or SC.

The voltage to be charged between the chill-roller and the flame electrode may range from 100-V to 20-KV, but preferably between 100-V and 4-KV. Flame treatment using voltages of less than 100-V does not produce satisfactory treatment effects. And, if voltages in excess of 20-KV are used, the plastic film may be destroyed.

The electric energy or current may be obtained from an electric power source (generator) which may give from 0.01 MA to 5A and which is controllable at the desired current value by the usual circuit involving variable resistances and condensers.

In accordance with the present invention, the forms of subject materials to be treated are plastic films, and plastics, both of which comprise such organic polymeric materials as polyolefines (polyethylene, polypropylene etc.), polyesters (polyethyleneterephthalate, etc.), polyamides (Nylon-6, Nylon-66, Nylon-12 etc.), polyacryls (polyacrylonitrile etc.), polyvinylchloride, polyimides, polycarbonates and other polymers which form films, and their copolymers. The applicable film forms may be either non-oriented, uniaxially oriented, or biaxially oriented films.

Figure 1:
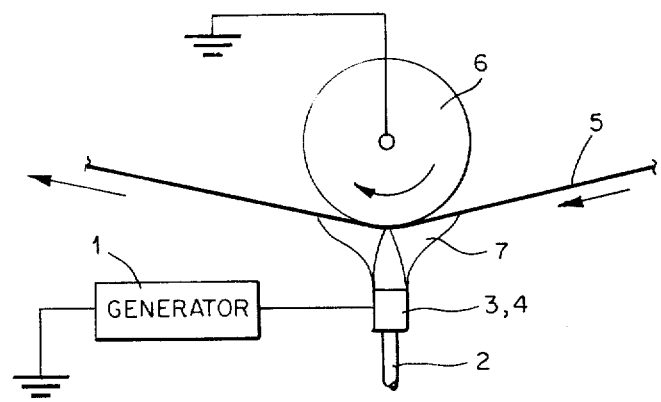
FIG. 1, FIG. 2 and FIG. 3 are plan views of apparatus according to the present invention.
Figure 2:
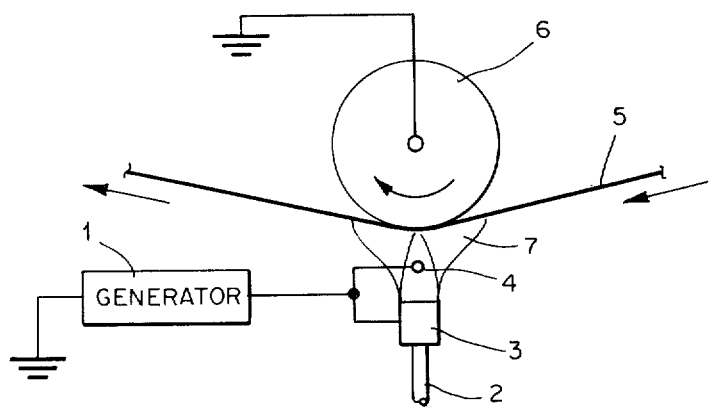
Figure 3:
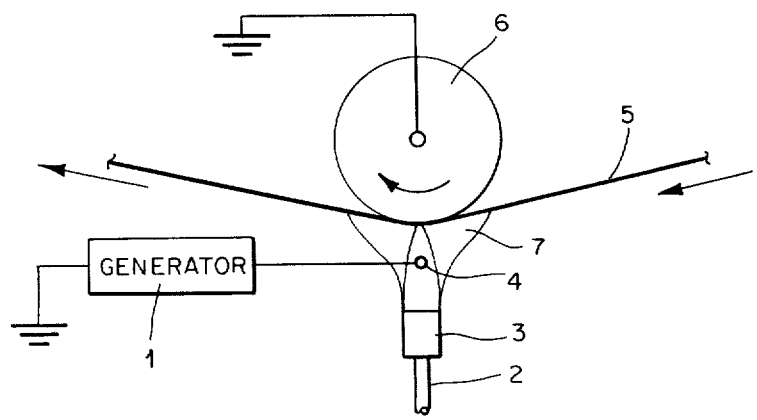

Typical embodiments of the methods and apparatuses according to the present invention are graphically illustrated in FIG. 1 through FIG. 3. In all three Figures, input electric power is delivered by the power-supplying circuit or generator 1 into a discharge electrode 4. Mixed gases for fuel for the self-continuous flames are introduced through an induction pipe 2 into a burner 3. In FIG. 1, the electrode 4 is also used as the burner 3. That is, the electrode and burner are combined, with the burner itself serving as the electrode. In FIG. 2 the burner 3 and the electrode 4 are separated physically in an equivalent electric circuit, but are connected together electrically so that both the electrode and the burner are charged. In FIG. 3, the burner 3 and the electrode 4 are also separated but in FIG. 3 the burner is separated electrically as well as physically from the electrode, so that only the electrode is charged.

Surface-treatment effects of the resulting film according to the processes of FIG. 1, FIG. 2 and FIG. 3 may be evaluated generally as follows: The FIG. 1 process is better than the FIG. 2 process, and the FIG. 2 process is better than the FIG. 3 process.

Three types of circuit may be used for the electric-power-supplying source or generator 1. The first is the usual AC circuit. The second is a DC circuit capable of being controlled to maintain either a positive electric potential or a negative electric potential on the flame electrode relative to ground. And the third is a superposed current circuit, with AC being superposed on DC.

Desirable treatment level is achieved when the film 5 is running on the chill-roller 6 at a speed of from 30 meters per minute to 150 meters per minute.

The chill-roller 6 is usually made of a metal which is conductive, but the surface of roller 6 may be coated with a dielectric substance, especially when higher voltages (more than 5 KV) are used.

The gap between the burner (or the electrode also) and the film surface is selected controllably within the range of 1.5 to 25 mm so that the luminous zone of the flames may always cover the film surface.

Appropriate exposure time is from 0.0005 to 0.1 second. Care must be taken, since more than 0.3 second exposure time will probably cause wrinkling of the film resulting from the heat of the flame 7.

The cooling temperature determined by chill-roller 6 and the flame-heat is difficult to define unconditionally because it must be carefully selected in accordance with such factors as film to be treated (the polymer species, degree of orientation, and other thermal properties). Chilled water or other cooling media may flow circularly into and out of the chill roll 6 to maintain a constant temperature, so that the plastic film may not be subjected to such undesirable effects as softening, wrinkles, or strains, due to the flame-heat, and especially heat-shrinkage in the case of stretched oriented films. To avoid such undesirable effects, the temperature should be maintained in the range from about 20°C to a 10°C below the melting point temperature of the polymer to be applied.

In accordance with the present invention, not only are the electric treatment and the flame treatment applied at the same time, but as a result excellent adhesiveness and receptivity are obtained owing to the multiplied effect of the both treatments. When the electric potential is charged upon the flame, both the combustion velocity and combustion charge increase, and as a result the content of heat energy against the surface of the film increases extremely. Besides, it is believed that ions and electrons which are excited in the flame activate the film surface by impact or bombarding energy upon the surface. This may explain the effect of the mechanism of the present invention. While the principle seems complicated, it has been observed that the treatment effect is multiplied.

The effects of prior art treatments such as the corona discharge process and the flame process, depend mainly upon an oxidation phenomenon on the substrates to be treated. The present invention, however, produces a new and different surface layer, just on the surface of the base substrates.

Furthermore, according to the present invention, electrets can be formed by providing the plastics with electro-static properties.

The multiplicative effects of the present invention are evident through the fact that this new method using an electrically charged flame remarkably increases the treatment level beyond that which could be obtained by using a flame treatment and a corona treatment individually and separately.

Following are some examples of treatments used and results obtained:

EXAMPLE 1

1. Substrates to be treated: Biaxially oriented isotactic polypropylene film (22 microns thick) preformed by the usual tenter method.
2. Treatments:
    2-1. Usual corona discharge treatment;
    2-2. usual gaseous flame treatment; and
    2-3. the treatment of this invention were applied.

The films after every treatment were evaluated concerning the adhesion of the surfaces.

2-1. Corona discharge treatment: Apparatus used was a Spark-gap type, Model HFSG, Lepel High Frequency Laboratories, Inc. This high frequency current was a damped wave. The treatment speed and the voltage applied were 80 m/min. and 10-KV, respectively.

2-2. Gaseous flame treatment was constructed under the following conditions.

Flame Treatment - Example 1

| fuel | propane |
|---|---|
| fuel : Oxygen | 3 : 2 |
| exposing time | 0.05 sec. |
| film running speed | 20 m/min. |
| gap between film and burner | 6 mm |

2-3. Treatment according to the present invention, followed the conditions tabulated below. Alternating current was used as the supply electric power. The direction of discharge was selected by connecting the chill-roller to ground and slowly varying the polarity of the electrode which served at the same time as a burner. In the tabulation of results which are given hereinafter, Group (A) identifies the case where electrons ran from the electrode towards the film by charging the electrode always minus. Group (B) identifies the case where the polarity was the reverse of that of Group (A).

Tabulation of Conditions Used for Treatment Under This Invention - Example 1

| fuel | propane |
|---|---|
| fuel : Oxygen | 1 : 1 |
| exposing time | 0.02 sec. |
| film running speed | 80 m/min. |
| gap between film and burner (electrode) | 2.5 mm |
| flame length | 3.5 mm |
| charged electric current | alternating current (2KV) superposed on direct current (peak-to-peak voltage 2KV) |
| frequency | 400 KHz |
| media in the chill roller | cool water |

3. Evaluation method of surface adhesiveness of the treated films.

3-1. critical surface tension, αc (dyne/cm), was measured by ASTM-D-2578-67-T method (at 20°C, 65% relative humidity).

3-2. Printability and heat-sealability: Primerless Ink PPG-61 (commercially on the market for PP film printing) was coated (at 60°C, 1 min. drying) on the treated film surfaces, and after setting about half an hour at room temperature, the rectangular peeling test was undertaken by using cellophane tape of a type available on the market. The peel strength was checked after 2, 15 and 30 days storage. The thermostability of the receptivity and adhesiveness were checked at 100°C and 135°C. Heat-sealability was evaluated by the above tension method after heatsealing the treated films on which some polyethylene-rich adhesive materials were coated.

4. Evaluation results.

Table 1 below shows the collective results. It is clear that treatment according to this present invention contributes remarkably toward improvement of adhesion than the corona-discharge or flame treatment. Uniformity and strength were obtained. There was no disadvantage that spoiled the film appearance (for example, no wrinkles, and no strains caused by heat).

On critical surface tension, this present invention solved the problem that the treatment effect of the corona-discharge method disappeared by heat. Furthermore increased critical-surface-tension and improved adhesiveness were maintained after long storage.

Concerning the ink-printability and heat-sealability, this invention achieved far more improvement than the corona-discharge or flame treatment methods. Also, there was no disappearance of thermostability after long storage. Moreover it is very noticeable that this invention conquered other problems, such as the destruction of the adhesive characteristics of the treatment, which usually occurred with the corona-discharge or the flame-treatment processes.

With respect to the uniformity of the treated surfaces — examining with the unaided eye the peeling traces after ink-coating, the treatment traces of the corona-discharge method were rough in density and extremely small in covered area, assuming discontinuous points or network-like patterns. The traces of the flame treatment appeared irregular, according to the rough distribution of the flame-heat, and especially in the desirable level for adhesion, heat shrinkage occurred. In contrast to the foregoing, using the method of this present invention, traces of both group (A) and group (B) were distributed uniformly on and all over the surfaces, and there was no irregularity or unevenness, as were usually found in the cases of the other processes. To explain more in detail, the (A) group's film surfaces were treated by activated electrons accelerated through the flame which contributed continuously and uniformly, and this effect of the (A) group treatment was larger than that of the corona-discharge treatment. Furthermore, the (B) group's film surfaces were treated strongly by such positive ions as hydrocarbons' in the flame, combined with the flame-heat itself. It must be emphasized that a hydrocarbon's ion, which is over 1,000 times heavier than an electron in weight, was accelerated against the film surface one by one. Thus treated films of both group (A) and (B) had excellent transparency (haze under 2%).

In the table below, the symbols θ and 0 in the table 1 show excellent and good appearances, respectively. It should be added that the high degree of critical-surface-tension gained in this example could not be achieved at all by the prior art flame-treatment without causing a heat-strain defect.

The ranks of the evaluation in Table 1 below about printability and heat-sealability are as follows:

| Rank | θ | O | * | X |
|---|---|---|---|---|
| Adhesion | excellent | good | fair | poor & failing |

As shown in Table 1, the treatment according to the present invention far exceeded such other methods as the corona-discharge and the flame-treatment methods with respect to improvement of critical-surface-tension, printability and heat-sealability. Also, the achieved acceptability for adhesion was maintained in the temperature range from room temperature to 135°C and didn't quench or disappear throughout long periods of many days. The superiority of the treatment effect of Group (B) to that of Group (A) indicates that the positive ions in the flame impact more effectively than the electrons.

As mentioned above, the superiority of the present invention, characterized by the simultaneous application of both the heat properties and the electrical properties of the flame, was corroborated by the tests. It was found that the treatment according to the present invention made a large improvement in the adhesive properties of film surface.

Figure 4:
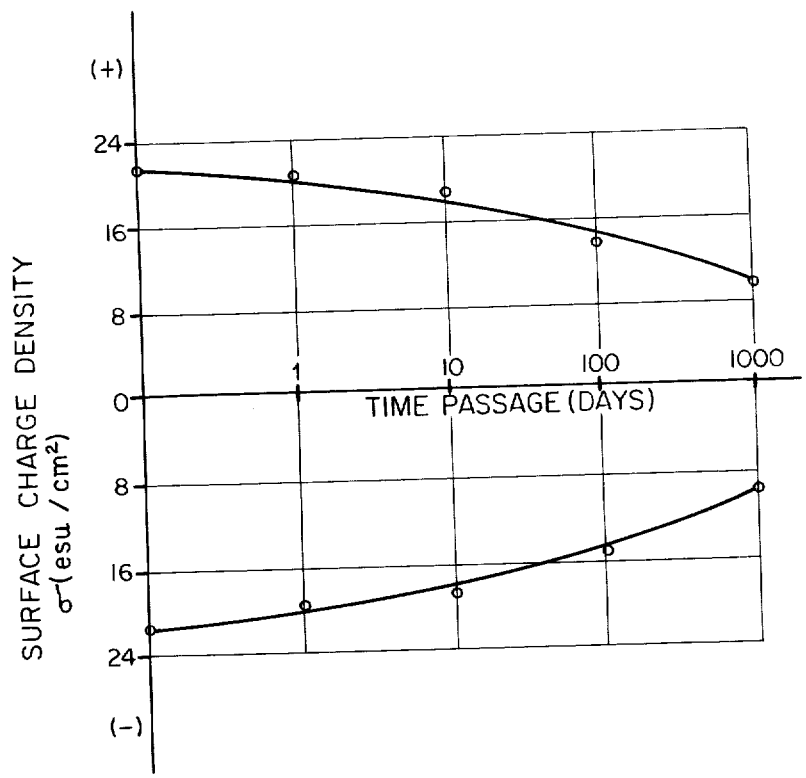
FIG. 4 is a graph showing the dependence of the surface electric charge density ($\sigma$) upon time-passage.

Another advantage of this invention is to produce electret materials. Following the procedure of Example 1, the treated film was electron charged for many days, as shown graphically in FIG. 4. The resulting electret films have a long lifetime, about 9 months, which is difficult to obtain by other electret manufacturing methods.

In Table 1 which follows, the code for the Evalauation Items is as follows:

I—Critical-surface-tension (dyne/cm)
II—Printability
III—Peel strength (g/cm)
IV—Appearance

EXAMPLE 2

1. Substrates to be treated were the same polypropylene films as in Example 1.
2. Treatments:
    D. Joint-use of the corona-discharge treatment and the flame treatment conditions used for each treatment are the same as in Example 1.
       D-1. The corona-discharge treatment in first step, and then the flame treatment.
       D-2. The flame treatment first, and then the corona-discharge treatment.
    E. The method of this invention — This case followed Example 1, except for the arrangements of the electrode and the burner. The burner and the electrode were set apart and connected electrically to each other to have equivalently in the same polarity.
3. Adhesion about printability and heatsealability were evaluated.
4. The results by various treatments are shown in Table 2.

In Table 2 which follows, the code for the Evaluation Items is as follows:
    I—Printability
    II—Peel Strength (g/cm)

TABLE 1

| Temperature | Storage after Treatment | Evaluation Items | Corona Discharge Treatment | Flame Treatment | Treatment by This Invention (FIG. 1) | |
|---|---|---|---|---|---|---|
| | | | | | Group (A) Electrode (−) | Group (B) Electrode (+) |
| room temperature (at 100°C) ↓ | just after treatment | I | 45 | 45 | 77 θ | 90 θ |
| | | II | 0 | 0 | θ | θ |
| | | III | 275 | 250 | 360 θ | 545 θ |
| | | IV | θ | 0 | θ | θ |
| | 2 days " | I | 43 | 44 | 77 θ | 90 θ |
| | " | II | 0 | 0 | θ | θ |
| | " | III | 260 | 250 | 360 θ | 550 θ |
| | " | IV | θ | 0 | θ | θ |
| | 15 days " | I | 41 | 43 | 75 θ | 89 θ |
| | " | II | *~0 | 0 | θ | θ |
| | " | III | 220 | 245 | 345 θ | 540 θ |
| | " | IV | θ | 0 | θ | θ |
| | 30 days " | I | 41 | 43 | 75 θ | 88 θ |
| | " | II | *~0 | 0 | θ | θ |
| | " | III | 210 | 243 | 350 θ | 538 θ |
| | " | IV | θ | 0 | θ | θ |
| | 2 days " | I | 38 | 43 | 75 θ | 90 θ |
| | " | II | * | 0 | θ | θ |
| | " | III | 105 | 245 | 340 θ | 540 θ |
| | " | IV | 0 | 0 | θ | θ |
| | 15 days " | I | 35 | 41 | 75 θ | 89 θ |
| | " | II | * | *~0 | θ | θ |
| | " | III | 46 | 220 | 340 θ | 545 θ |
| | " | IV | 0 | 0 | θ | θ |
| | 30 days " | I | 33 | 40 | 74 θ | 87 θ |
| | " | II | X | *~0 | θ | θ |
| | " | III | 18 | 205 | 337 | 538 |
| | " | IV | 0 | 0 | 0 | 0 |
| After heat-treatment at 135°C, 3 minutes of the just treated films. | | I | 33 | 39 | 74 θ | 87 θ |
| | | II | X | *~0 | θ | θ |
| | | III | 20 | 220 | 340 θ | 535 θ |
| | | IV | 0 | 0 | θ | θ |

TABLE 2

| Temperature | Storage After Treatment | Evaluation Items | D. (Corona-Discharge + Flame) Jointed Treatment | | Group (A) Electrode (−) | Group (B) Electrode (+) E. This Invention (FIG. 2) |
|---|---|---|---|---|---|---|
| room temperature | just after the treatment | I | θ | θ | θ | θ |
| | | II | 280 | 330 | 365 | 548 |
| | 2 days | I | θ | θ | θ | θ |
| | | II | 250 | 300 | 360 | 540 |

TABLE 2 – Continued

| Temperature | Storage After Treatment | Evaluation Items | D. (Corona-Discharge + Flame) Jointed Treatment | Group (A) Electrode (−) | Group (B) Electrode (+) E. This Invention (FIG. 2) |
|---|---|---|---|---|---|
| ↑ | 15 days | I | 0 | θ | θ |
|  |  | II | 227 | 275 | 350 | 540 |
|  | 30 days | I | 0 | 0 | θ | θ |
|  |  | II | 195 | 250 | 345 | 540 |
|  | 2 days | I | 0 | 0 | θ | θ |
|  |  | II | 170 | 243 | 345 | 545 |
|  | 15 days | I | * | 0 | θ | θ |
| at 100°C |  | II | 110 | 245 | 340 | 540 |
|  | 30 days | I | * | 0 | θ | θ |
| ↓ |  | II | 105 | 240 | 335 | 535 |
| After heat-treatment at 135°C, 3 minutes of the just treated films |  | I | * | 0 | θ | θ |
|  |  | II | 102 | 225 | 340 | 535 |

EXAMPLE 3

This case followed Example 1, Treatment (2-3) except for the arrangements and the currents. The burner and the electrode were set apart and not connected electrically. An alternating current (not superposed on DC) of peak-to-peak 2KV was used.

In this case, because alternating current was used, the polarity coincided with that of Group (A) in Example 1 at the moment when the electrode was negatively charged, and the polarity coincided with that of in Group (B) at the moment when the electrode was positively charged. In the former, the effect of the electron's impact against the film surfaces through the flame was still maintained, but in the latter, the probability of ion-impact against the film surface would seem to decrease because the polarity changes plus and minus in very short times due to the high frequency. Thus, the degree of the adhesive improvement in this Example would appear to be slightly less, compared with that in Example 1. Surprisingly, better improvement was obtained than by any of the corona-discharge, flame, and the two-independently-joined treatment processes. And it must be mentioned that this case of Example 3 has an advantage in that the electric charge should hardly remain on the treated surface.

In Table 3 which follows, the code for the Evaluation Items is as follows:
I—Printability
II—Heat Sealability (g/cm)

TABLE 3

| Temperature | Storage After Treatment | Evaluation Items | This Invention (FIG. 3) Electrode (AC) Result |
|---|---|---|---|
| ↑ | just after the treatment | I | θ |
|  |  | II | 345 |
| room temperature | 2 days | I | θ |
|  |  | II | 340 |
|  | 15 days | I | θ |
|  |  | II | 343 |
| ↓ | 30 days | I | θ |
|  |  | II | 340 |
| ↑ | 2 days | I | θ |
|  |  | II | 340 |
| at 100°C | 15 days | I | θ |
|  |  | II | 330 |
| ↓ | 30 days | I | θ |
|  |  | II | 330 |
| After heat-treatment at 135°C, 3 minutes of the just treated films |  | I | θ |
|  |  | II | 335 |

Table 3 shows the evaluation result of the example 3.

What is claimed is:

1. A method for the production of plastic materials having improved surface-bonding properties which comprises passing the plastic material through an electrically charged flame, said flame being continuous and electrically charged to create a corona in the presence of activated ions moving through the flame and impinging upon the surface of the plastic material.

2. The method of claim 1 wherein the flame is charged by a voltage in the range from 100-V to 20-KV.

3. The method of claim 1 wherein the ions impinging upon the surface are positive ions.

4. The method of claim 1 wherein the ions impinging upon the surface are electrons.

5. The method of claim 1 wherein the voltage is alternating.

6. The method of claim 1 wherein the plastic material is in the form of a film.

7. The method of claim 6 wherein one surface of the film is exposed to the electrically charged flame.

8. The method of claim 7 wherein the flame is charged by a voltage in the range from 100-V to 20-KV.

9. The method of claim 8 wherein the voltage range is from 100-V to 4-KV.

10. The method of claim 8 wherein the voltage is positive.

11. The method of claim 8 wherein the voltage is negative.

12. The method of claim 8 wherein the voltage is alternating.

* * * * *